Sept. 6, 1938. A. Y. DODGE Re. 20,846

VARIABLE SPEED TRANSMISSION

Original Filed Sept. 19, 1930 4 Sheets-Sheet 1

Inventor:
Adiel Y. Dodge.
By: Jones, Addington, Amos & Fitch
Attys.

Witness:
David S. Magnusson.

Sept. 6, 1938. A. Y. DODGE Re. 20,846

VARIABLE SPEED TRANSMISSION

Original Filed Sept. 19, 1930 4 Sheets-Sheet 2

Inventor
Adiel Y. Dodge
By Jones, Addington, Amos & Seibold
Attys.

Witness:
David S. Magnusson.

VARIABLE SPEED TRANSMISSION

Original Filed Sept. 19, 1930 4 Sheets-Sheet 3

Witness:
David S. Magnusson.

Inventor:
Adiel Y. Dodge.
By Jno. Addington, Jones & Seibold.
Attys.

VARIABLE SPEED TRANSMISSION

Original Filed Sept. 19, 1930 4 Sheets-Sheet 4

Inventor.
Adiel Y. Dodge.
By: Jones, Addington, Ames & Seidel.
Attys.

Witness:
David S. Magnusson.

Reissued Sept. 6, 1938

Re. 20,846

UNITED STATES PATENT OFFICE 20,846

VARIABLE SPEED TRANSMISSION

Adiel Y. Dodge, South Bend, Ind.

Original No. 2,039,147, dated April 28, 1936, Serial No. 482,952, September 19, 1930, renewed June 22, 1933. Application for reissue January 12, 1938, Serial No. 184,686

26 Claims. (Cl. 74—260)

My invention relates to variable speed transmission.

One of the objects of my invention is to provide an improved variable speed transmission suitable for automobiles, and the like, in which an improved automatic pickup is provided between the engine and the propeller shaft.

A further object is to provide such a construction in which improved means are provided for effecting reverse movement.

Still another object is to provide a variable speed transmission in which the variable speed elements are called on to handle less power than the input power.

Further objects will appear from the description and claims.

In the drawings, in which an embodiment of my invention is shown:

Figure 1:
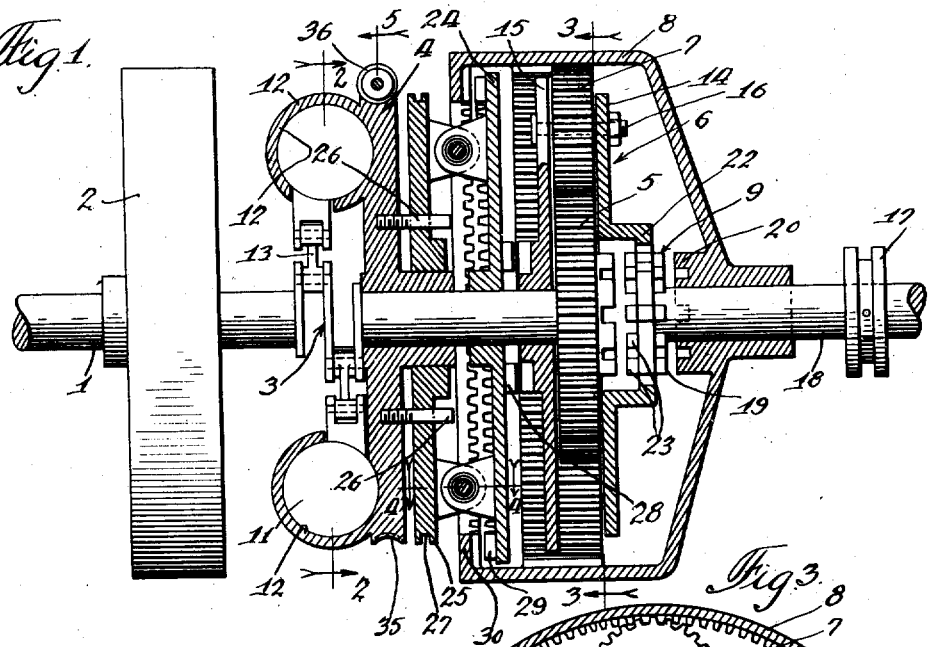
Figure 1 is an axial section.
Figure 3:
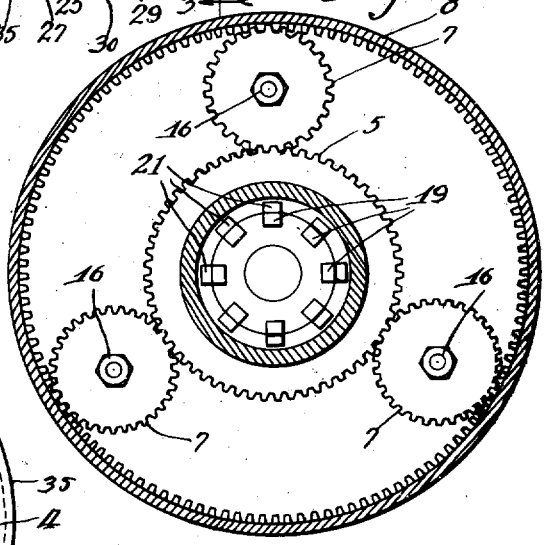
Figure 3 is a section substantially on the line 3—3 of Figure 1.
Figure 2:
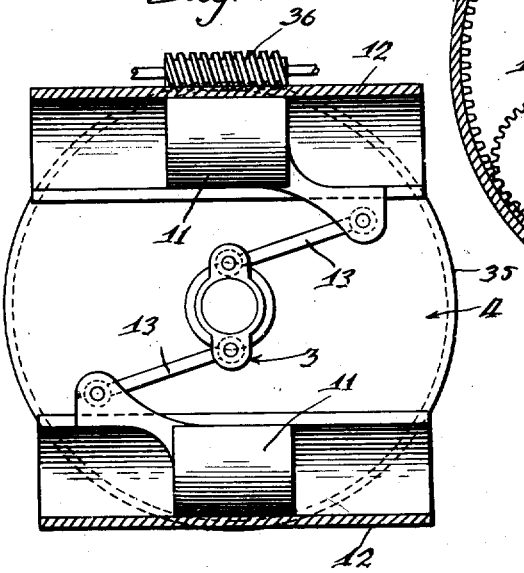
Figure 2 is a section substantially on the line 2—2 of Figure 1.

Referring to the drawings in general, the construction shown comprises a drive shaft 1 which may be an extension of the crankshaft for an internal combustion engine for automobiles, a flywheel 2 rotatable with the drive shaft, a double-throw crankshaft 3 rotatable with the drive shaft, a driven rotor 4 which may also serve as a flywheel, mass inertia transmission between the crankshaft and driven rotor, a sun gear 5 also rotatable as a unit with the drive shaft 1, a gear carrier 6, planetary gearing 7 mounted on said gear carrier, a driven ring gear 8 meshing with said planetary gear, a dog clutch 9 shiftable axially to four different positions, means for alternatively connecting the driven rotor either with the ring gear or with the gear carrier, a reversible impulse rectifying clutch 10 for holding the driven rotor 4 against reverse rotation to effect low speed positive forward and intermediate variable forward speeds under one set of conditions, and to effect reverse rotation of the driven rotor 4 under another set of conditions.

The mass inertia transmission between the crankshaft 3 and the rotor 4 may comprise a pair of pistons or plunger members 11 for reciprocation in a pair of guide members 12 on the rotor 4, and a pair of connecting rods 13 connecting the double-throw crankshaft 3 with the plungers 11.

The gear carrier 6 may comprise a pair of plates 14 and 15 between which the sun gear 5 and planetary gearing 7 are located, the planetary gearing 7 being mounted on short pins or shafts 16 extending from one plate to the other.

The dog clutch 9 may be shiftable axially by means of a shifting collar 17 secured to the driven shaft 18 on which the dog clutch 9 is mounted to any one of four different positions. When the dog clutch 9 is in the extreme righthand position, the laterally extending teeth 19 on the dog clutch engage correspondingly shaped notches in the clutch member 20 on the hub on the ring gear 8 so that in this position the driven shaft rotates with the ring gear.

In the next position of the dog clutch 9, that is the position next to the extreme right-hand position, the clutch is in neutral, that is to say, none of the teeth on the dog clutch are in engagement with any part of the planetary gearing so that all parts of the planetary gearing may rotate without causing any rotation of the driven shaft 18.

In the next position of the dog clutch, that is, the position next to the extreme left-hand position, the radially extending teeth 21 of the clutch 9 are in engagement with correspondingly shaped radial notches on the flange 22 of the plate member 14 of the gear carrier. In this position, therefore, the driven shaft 18 is connected to rotate with the gear carrier 6.

In the extreme left-hand position, the laterally extending teeth 23 of the dog clutch 9 are in engagement with correspondingly shaped notches on the hub portion of the sun gear 5. In this position, therefore, the drive is direct from the drive shaft 1 to the driven shaft 18.

The means for alternatively connecting either the ring gear or the gear carrier with the driven rotor 4 comprises an axially shiftable clutch member 24 for alternative engagement either with the ring gear or the gear carrier and an axially shiftable clutch shifting ring 25 having a yielding connection with the shiftable clutch member 24. This clutch shifting ring 25 is connected with the driven rotor 4 so as to be rotatable therewith, but is shiftable axially with respect thereto by means of a pair of drive pins 26 secured to the rotor 4 and extending through openings in the clutch shifting plate or ring 25. The clutch shifting plate 25 may be provided with an annular channel 27 for engagement with any suitable shifting pin.

When the clutch shifting ring and clutch are shifted to the right-hand position in Fig. 1 the laterally extending teeth 28 on the clutch member engage correspondingly shaped recesses on the hub of the plate of the gear carrier so that in this position the gear carrier is connected with the clutch member 24. When the axially shiftable clutch member is moved to its left-hand position the laterally extending teeth 29 on the clutch member engage correspondingly shaped recesses on the flange 30 of the ring gear carrier so that in this position the clutch member is connected with the ring gear.

Figure 4:
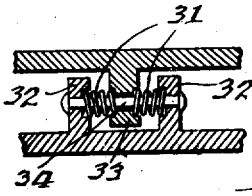
Figure 4 is a section substantially on the line 4—4 of Figure 1.

In order to cushion the effect of the impulses of the driven rotor 4 on the shiftable clutch member 24 a cushioning connection, shown in Fig. 4, is provided between the clutch shifting plate 25 and the clutch member. This cushioning construction comprises a pair of coil compression springs 31 located between laterally extending ears 32 on the clutch shifting member and a laterally extending ear 33 on the clutch plate.

In order that lateral shifting of the clutch shifting plate 25 may also effect lateral shifting of the clutch member 24, a pin or bolt 34 is provided extending between the laterally extending ears 32 on the clutch shifting plate and through the laterally extending ear 33 on the clutch plate. This pin 34 also serves to center and position the cushioning springs 31 through which it extends. The reversible impulse rectifying clutch construction comprises a worm gear 35 formed as an integral part of the driven rotor 4, a worm 36 meshing with this worm gear and mounted in suitable spaced bearings 37 in the housing 38, and capable of slight endwise movement in said spaced bearings, a pair of conical friction discs 39 mounted on the shaft 40 of the worm, a pair of conical friction surfaces 41 cooperating with the friction discs 39, respectively, a pair of slidably mounted thrust-bearing members 42 cooperating with the ends of the worm shaft, a pair of coil compression springs 43 for holding the thrust-bearing members in cooperative relation with respect to the ends of the worm shaft, and means for selectively placing either one of the friction discs 39 in condition to be forced by endwise movement of the worm shaft into engagement with the cooperating conical friction surface 41. The latter means comprises a pair of screws 44 engageable with the thrust bearings, respectively, a pair of rock arms 45 mounted on the screws 44, respectively, a rock shaft 46 and a pair of forked rock arms 47 mounted on this rock shaft and engageable with the pins 48 on the rock arms.

Figure 5:
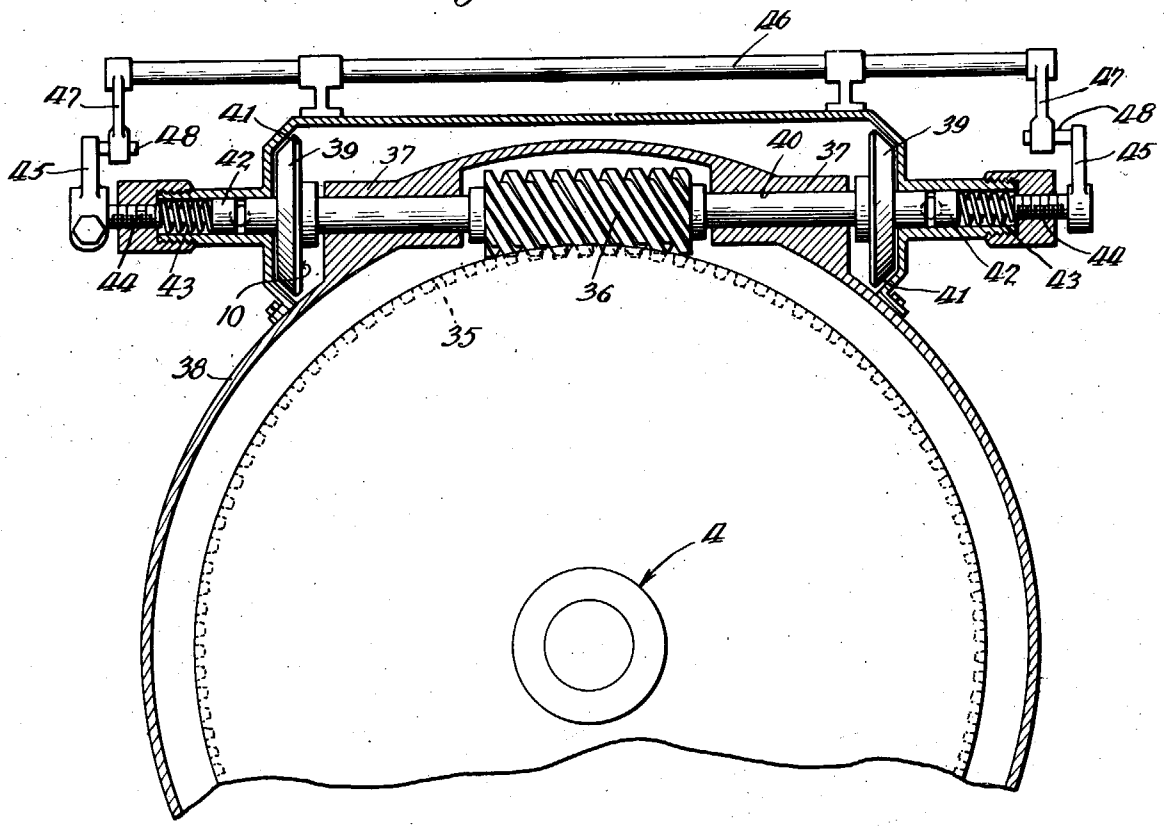
Figure 5 is a section on the line 5—5 of Figure 1.

In operation the impulse rectifying construction may be set so as to permit free rotation of the worm gear in one direction, but so as to prevent rotation of the worm gear in the opposite direction. If it is desired to permit clockwise rotation of the worm gear as seen in Fig. 5, the rock shaft 46 is moved to a position which will shift the right-hand slidably mounted thrust bearing to the left, to an extent sufficient to prevent any contact between the right-hand friction disc 39 and its corresponding friction surface 41 (but not, however, far enough to actually bring the left-hand friction disc 39 into contact with its corresponding friction surface 41). With this setting, if an impulse is exerted on the worm gear, tending to move it in a clockwise direction, there will be practically no resistance offered to this rotation by the worm as it can rotate freely, both of the friction discs being out of engagement with their respective friction surfaces. However, if an impulse is exerted on the worm gear, which gives it a very slight counterclockwise rotation, the left-hand friction disc 39 will immediately be moved into engagement with its friction surface 41, and due to the mechanical advantage offered by the friction disc and worm, counterclockwise rotation of the worm gear will be prevented. The disengagement of the left-hand friction disc with its friction surface is permitted because of the fact that the screw 44 which controls the thrust bearing 42 has been moved to a position in which it is a slight distance away from the adjacent end of the thrust bearing.

In order to cause reverse or counterclockwise rotation of the worm gear the rock shaft 46 is moved to a position which will cause the left-hand thrust bearing 42 to slide to a position which will prevent the left-hand friction disc 39 from engaging its friction surface 41 and which will withdraw the screw 44 which controls the right-hand thrust bearing 42 from engagement with this thrust bearing sufficiently to permit the right-hand friction disc 39 to engage its friction surface 41 upon clockwise rotation of the worm gear. Under this set of conditions the worm gear can rotate freely in a counterclockwise direction because of the fact that the left-hand friction disc cannot engage its friction surface. However, if an impulse is exerted on the worm gear, which moves it slightly in a clockwise direction, the right-hand friction disc will immediately engage its friction surface and prevent clockwise rotation of the worm gear.

For low speed positive forward and intermittent variable forward speeds the rectifying clutch 10 is set so as to permit forward rotation and prevent reverse rotation. This gives effect to the forward impulses of the mass inertia transmission, but kills off the effect of the impulses tending to give reverse rotation to the driven rotor 4. Under these conditions the clutch member 24 being connected with the flange 30 of the ring gear 8, the positive impulses exerted on the driven rotor 4 will be communicated to the ring gear, causing it to pick up speed gradually until it is rotating at the same speed as the driving rotor 3.

For low speed forward the dog clutch 9 is shifted to engage the flange 22 of the gear carrier 6 and the impulse rectifying clutch 10 is put in condition to prevent reverse rotation. Under these conditions the driven rotor 4 will at first remain stationary and the gear carrier 6 will be driven in a forward direction but at a slower speed than the sun gear 5, thus giving a positive low speed forward to the driven shaft 18. Intermediate and high speed can be secured with the parts in this condition as the positive impulses of the driving rotor 3 would eventually cause forward rotation of the driven rotor 4, and this forward rotation of the driven rotor 4 would increase in speed until it equalled that of the driving rotor 3, causing a 1 to 1 speed ratio between the drive shaft 1 and the driven shaft 18.

In this position of the parts the input power is divided into two parallel paths which are recombined at the driven member. One of these paths includes the extension of the shaft 1 terminating in the sun gear 5 and the other includes the variable speed mass-inertia transmission and the ring gear 8. Both the sun and ring gears tend to drive the carrier 6 in the same direction and reaction on the carrier produced by the load on the shaft 18 tends to turn both of these gears in a direction opposite to their normal direction of rotation. Thus regeneration where the torque on the driving shaft is cumulative is avoided and the power transmitted by each of the parallel paths in the present structure is less than the input power on shaft 1.

For reverse, the dog clutch 9 would be connected with the ring gear 8, the clutch member 24 would be connected with the gear carrier 6 and the impulse rectifying clutch 10 would be put in condition to prevent forward rotation of the gear carrier 6. Under these conditions forward rotation of the sun gear 5 would cause reverse rotation of the ring gear 8, as the gear carrier 6 would be held against forward rotation. As the dog clutch 9 is connected with the ring gear under these conditions, the shaft 18 would be rotated in a reverse direction.

In addition to the above driving connections it will be apparent that the clutches 24 and 9 can be shifted to other positions to produce other conditions of drive between the driving and driven shafts. Thus with the clutch 9 in its extreme left position as seen in Fig. 1 the driving and driven shafts are directly connected and both the gearing and impulse transmission are ineffective regardless of the position of clutch member 24. If the clutch member 24 is in its central position and out of engagement with both the ring gear 8 and gear carrier 6 the transmission is in neutral with no connection between the driving and driven shafts for any position of the clutch 9 except the extreme left position thereof described above.

If desired the impulse transmission may be connected directly to the driven shaft and the gearing rendered ineffective either by shifting clutch 24 to the left and clutch 9 to the right to connect both with ring gear 8 or by shifting clutch 24 to the right and clutch 9 to the central position to connect both to the gear carrier 6. In either of these positions impulse drive is transmitted directly to the driven shaft at ratios varying from 0 to 1 to 1 and the gearing rotates idly without affecting the transmission.

Figure 6:
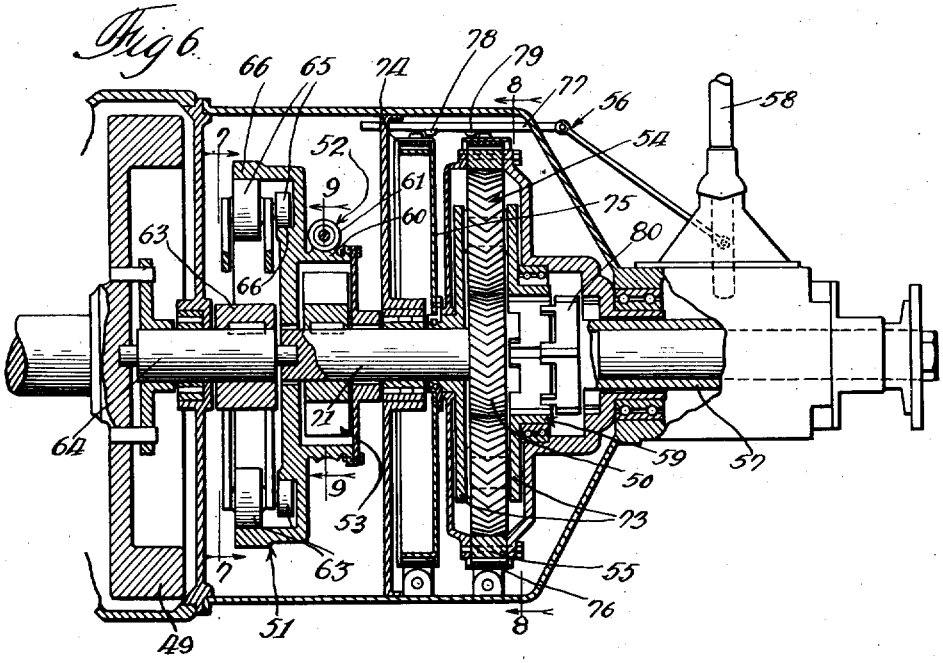
Figure 6 is an axial sectional view showing another form of my invention.
Figure 7:
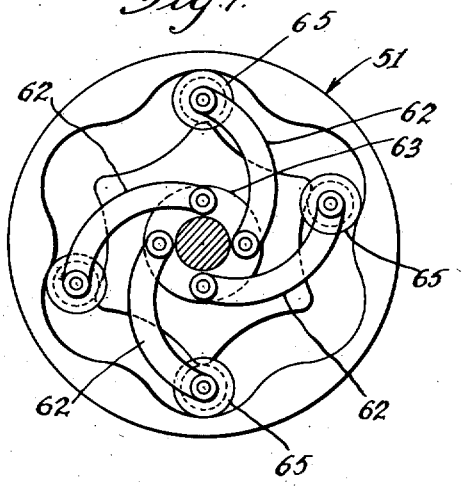
Figure 7 is a section on the line 7—7 of Figure 6.
Figure 8:
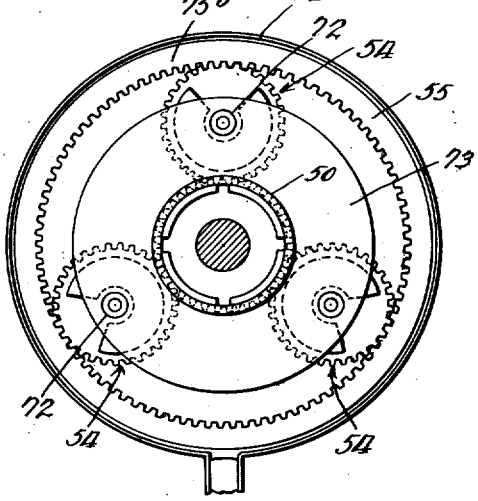
Figure 8 is a section on the line 8—8 of Figure 6.

The construction shown in Figs. 6, 7 and 8 comprises a transmission between the fly wheel 49 and sun gear 50, including an impulse transmission 51, a one-way reactance clutch 52, and an impulse transformer or equalizer 53, planetary gearing 54 meshing with the sun gear 50, a reversible ring gear 55 meshing with the planetary gearing, means 56 for properly controlling the rotation of the planetary gearing and the reversible gear, and means for connecting the propeller shaft 57 either with the ring gear or with the planetary gearing, or for placing it in neutral position.

Before describing further the details of construction I will briefly outline the operation. For forward driving, the rotation-controlling lever 58 is first placed in position to hold the ring gear 55 against rotation and the propeller shaft 57 is connected with the planetary gear carrier 59. The engine is put in operation, and as it speeds up it exerts rotational impulses on the worm gear 60, first in one direction and then in another through the centrifugal impulse transmission 51. The worm, 61, however, renders the reversely-acting impulses ineffective, permitting only the forward impulses to be effective. This results in a forward rotation of the worm gear 60 and consequently of the sun gear 50 which is connected with the worm gear through the impulse regulator or equalizer 53. This rotation of the sun gear causes a positive slower rotation of the planetary gearing 54 and hence of the propeller shaft 57. It will be noted that there are two stages of torque multiplication when the transmission is used as above described, one being because of the impulse transmission 51 and one-way reactance clutch 52, and the other being in consequence of the slower speed of the planetary gearing 54 with respect to the sun gear 50.

As the speed of the planetary gear carrier 59 increases, the eccentrically-weighted planet gears 54 will cause an increasing tendency for the ring gear 55 to rotate in a forward direction, and when this tendency of the ring gear to rotate becomes sufficiently great the rotation-controlling lever 58 may be placed in neutral, whereupon the ring gear 55 will rotate faster and faster until it finally rotates at the same speed as the planetary gearing 54, thus effecting a one to one transmission from the flywheel 49 to the propeller shaft 57.

For reverse drive, the rotation-controlling lever 58 is placed in position to release the ring gear 55 for rotation and to hold the planet gear carrier 59 against rotation. The propeller shaft 57 is connected with the ring gear 55. Under these conditions when the engine is in operation the sun gear 50 will rotate as above described and this rotation of the sun gear will cause reverse rotation of the ring gear 55 in the well-known manner of planetary gearing.

The impulse transmission between the flywheel and worm gear may be substantially the same as that disclosed in my copending application Serial No. 439,285, comprising a plurality of arms 62 pivotally mounted on a collar 63 secured to the flywheel shaft 64 and carrying at their free ends rollers 65 for engagement with tracks 66 on the worm gear 60.

The one-way reactance clutch may be the same as that just described in connection with Fig. 1 comprising the worm gear 60 and worm 61. The impulse regulator or equalizer may be the same as that disclosed in my copending application, Serial No. 439,285, comprising cushioning members 67 disposed between inwardly extending vanes 68 on the worm gear 60 and outwardly extending vanes 69 on a collar 70 secured to the sun gear shaft 71.

The planetary gear 54 may be mounted on shafts 72 secured in oppositely disposed plates 73 forming the planetary gear carrier. The rotation of the planet gear carrier may be controlled by means of a brake-band 74 engaging a brake drum 75 secured to the hub of the gear carrier plate 73.

The rotation of the ring gear may be controlled by means of a brake-band 76 engaging the periphery of the ring gear 55. The two brake-bands may be controlled by a cam slide 77 connected to the rotation-controlling lever 58. When the rotation-controlling lever 58 is moved rearwardly the cam slide 77 is moved forwardly, causing the cam member 78 to operate on the brake-band 74 to render it effective to hold the brake drum 75 against rotation. When the rotation-controlling lever is in vertical neutral position both cam members 78 and 79 are out of cooperative relation with their respective brake-bands. When the rotation-controlling lever is in forward position the cam slide is in its rear position and the cam member 79 engages the brake-band 76 to hold the ring gear 55 against rotation.

The propeller shaft may be shifted longitudinally in any suitable manner to bring the dog clutch 80 to any one of three different positions. In its rearmost position the dog clutch 80 engages the corresponding clutch formation of the ring gear 55 for reverse rotation. In its extreme forward position the dog clutch engages the clutch formation on the sun gear 55 for direct drive. In an intermediate forward position the dog clutch engages the planet gear carrier for low speed forward and all intermediate speeds. In an intermediate rear position the dog clutch is neutral and not in engagement with any driving member.

The planet gears may be eccentrically weighted, thus making of them an impulse transmission acting between the sun gear and ring gear.

Figure 10:
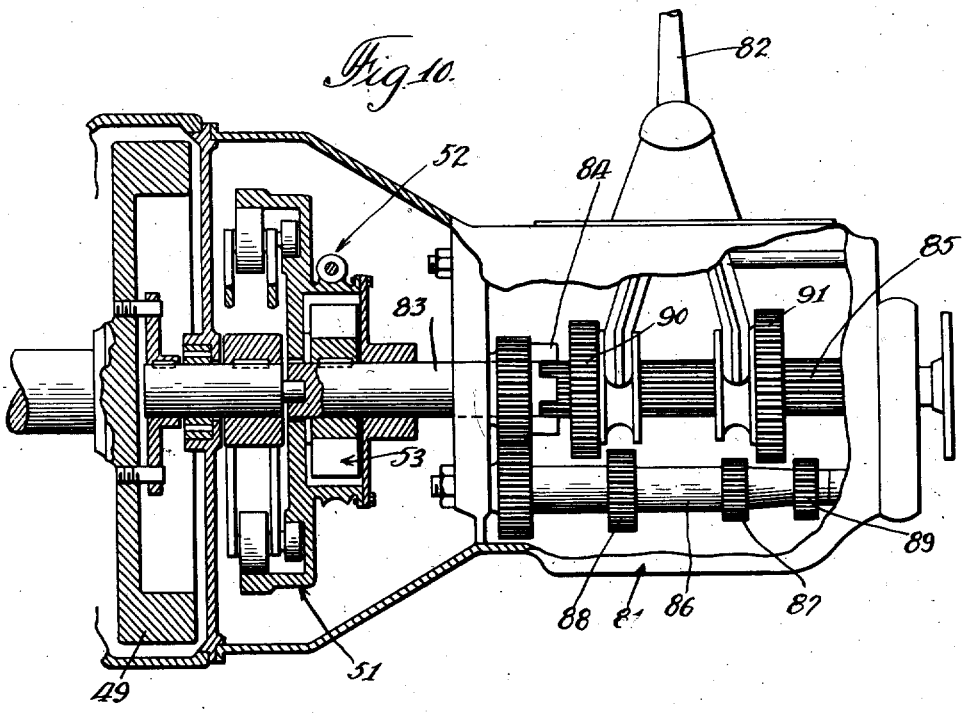
Figure 10 is an axial sectional view showing still another form of my invention.
Figure 9:
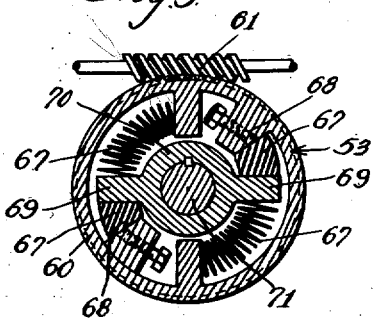
Figure 9 is a section on the line 9—9 of Figure 6.

In Figs. 9 and 10, I have shown a construction in which the transmission is provided between the engine flywheel 49 and an ordinary sliding gear transmission 81, such as is not commonly used in automobile transmissions, this intermediate transmission comprising an impulse transmission 51, a one-way reactance clutch 52, and an impulse equalizer or regulator 53 similar in every respect to the impulse transmission, one-way reactance clutch and impulse regulator described in connection with Fig. 6. This provides a centrifugal pick-up with an increase of torque ahead of the sliding gear transmission, dispensing with the necessity of the usual foot-controlled clutch and enabling a smooth graduated pick-up to be obtained.

The sliding gear transmission may be of any suitable type usually comprising a gear shift lever 82 shiftable to any one of the four usual speed positions, in one of which the drive is direct from the shaft 83 through the usual clutch 84 to the propeller shaft 85. The shift to the various speeds is accomplished in the usual manner through the counter-shaft 86 having the low and second speed pinions 87 and 88 respectively, the reverse pinion 89 and the reverse idler (not shown), the shift being accomplished through the propeller shaft gears 90 and 91.

While several embodiments of the invention have been shown and described in detail, it will be understood that many changes might be made therein and it is not intended to limit the scope of the invention to the forms shown nor otherwise than by the terms of the appended claims.

I claim:

1. A variable speed transmission comprising a driving rotor, a driven rotor, mass inertia transmission between said driving rotor and driven rotor, comprising means for exerting alternating impulses on said driven rotor, and one-way reactance clutch means preventing rotation of the driven rotor in one direction but permitting it in the other, a sun gear rotatable substantially with said driving rotor, a gear carrier, planetary gearing mounted on said gear carrier and meshing with said sun gear, a driven gear meshing with said planetary gearing, driving connections between said driven rotor and driven gear and means for holding said gear carrier against rotation to effect reverse rotation of the driven gear.

2. A variable speed transmission comprising a driving rotor, a driven rotor, mass inertia transmission between said driving rotor and driven rotor, comprising means for exerting alternating impulses on said driven rotor, and one-way reactance clutch means preventing rotation of the driven rotor in one direction but permitting it in the other, a sun gear rotatable substantially with said driving rotor, a gear carrier, planetary gearing mounted on said gear carrier and meshing with said sun gear, a driven gear meshing with said planetary gearing, driving connections between said driven rotor and driven gear, means for holding said gear carrier against rotation to effect reverse rotation of the driven gear, and means whereby the driven gear may be disconnected from the driven rotor for reverse.

3. A variable speed transmission comprising a driving rotor, a driven rotor, mass inertia transmission between said driving rotor and driven rotor, comprising means for exerting alternating impulses on said driven rotor, and one-way reactance clutch means preventing rotation of the driven rotor in one direction but permitting it in the other, a sun gear rotatable substantially with said driving rotor, a gear carrier, planetary gearing mounted on said gear carrier and meshing with said sun gear, a driven gear meshing with said planetary gearing and connections whereby either said gear carrier or said driven gear may be connected alternatively with said driven rotor.

4. A variable speed transmission comprising a driving rotor, a driven rotor, mass inertia transmission between said driving rotor and driven rotor, comprising means for exerting alternating impulses on said driven rotor, and one-way reactance clutch means preventing rotation of the driven rotor in one direction but permitting it in the other, a sun gear rotatable substantially with said driving rotor, a gear carrier, planetary gearing mounted on said gear carrier and meshing with said sun gear, a driven gear meshing with said planetary gearing, connections whereby either said gear carrier or said driven gear may be connected alternatively with said driven rotor, and means for holding said gear carrier against rotation whereby said driven gear when disconnected from said driven rotor may be given reverse rotation.

5. A transmission comprising a rotatable driving member, a planetary transmission comprising a sun gear rotatable with said driving member, a gear carrier coaxial with the sun gear, gearing on said gear carrier meshing with said sun gear and a driven gear coaxial with the sun gear and meshing with the gearing, and mass inertia transmission driven by said driving member and connectible alternatively either with said driven gear or with said gear carrier.

6. A variable speed transmission comprising a driving rotor, a driven rotor coaxial therewith, a mass inertia transmission between said rotors, comprising means for exerting alternating impulses on said driven rotor, and one-way reactance clutch means preventing rotation of the driven rotor in one direction but permitting it in the other, a sun gear rotatable substantially as a unit with said first rotor, a gear carrier coaxial with said sun gear, a planetary gearing on said gear carrier meshing with said sun gear, and a driven gear meshing with said planetary gearing and rotatable substantially as a unit with said second rotor.

7. A variable speed transmission comprising a first rotor, a second rotor coaxial therewith, a mass inertia transmission between said rotors, a sun gear rotatable substantially as a unit with said first rotor, a gear carrier coaxial with said sun gear, a planetary gearing on said gear carrier meshing with said sun gear, a driven gear meshing with said planetary gearing and rotatable substantially as a unit with said second rotor, and a cushioning impulse transmission between said second rotor and said driven gear.

8. An automobile transmission between the engine crankshaft and the propeller shaft comprising a variable speed centrifugal clutch having a centrifugally acting weight, and variable transmission between the centrifugal clutch and the propeller shaft comprising means whereby the propeller shaft may be driven in a direction reverse to that of the crankshaft or may be driven at different forward speeds in the same direction as the crankshaft, said variable transmission comprising a sun gear, a planet gear, a reversible gear driven by said planetary gearing, and means whereby either said reversible gear or said planetary gearing may be made to rotate with and at the same speed as the driven side of the centrifugal clutch.

9. A variable speed transmission comprising a driving rotor member, a driven rotor member, transmission means between said driving member and driven member comprising means whereby said driving member exerts alternating impulses on said driven rotor, one-way reactance clutch means preventing any substantial rotation of the driven rotor in one direction but permitting it in the other, a triple-rotor planetary transmission comprising a first rotatable gear, a second rotatable gear, a rotatable gear carrier, and planetary gearing on said gear carrier meshing with said first gear and said second gear, transmission between said driving rotor member and one of three rotors of the planetary transmission, and transmission between said driven rotor member and another of the three rotors of the planetary transmission.

10. A variable speed transmission comprising a driving rotor member, a driven rotor member, transmission means between said driving member and driven member comprising means whereby said driving member exerts alternating impulses on said driven rotor, one-way reactance clutch means preventing any substantial rotation of the driven rotor in one direction but permitting it in the other, a triple rotor planetary transmission comprising a first rotatable gear, a second rotatable gear, a rotatable gear carrier, and planetary gearing on said gear carrier meshing with said first gear and said second gear, transmission between said driving rotor member and said first gear, and transmission between said driven rotor and said second gear.

11. A transmission for connecting a driving shaft and a driven shaft or the like, comprising a planetary transmission including a driven element connected to said driven shaft and which driven element is acted on by two driving elements, one of which is operated directly by the driving shaft and the other of which is operated indirectly by the driving shaft and an alternating-impulse mass inertia device forming a driving connection between the driving shaft and said indirectly driven element and having one-way clutch means preventing the negative impulses from acting on the driven element.

12. A transmission for connecting a driving shaft and a driven shaft or the like, comprising a planetary transmission including a driven element connected to said driven shaft and which driven element is acted on by two driving elements, one of which is operated directly by the driving shaft and the other of which is operated indirectly by the driving shaft, and an alternating-impulse mass inertia device forming a driving connection between the driving shaft and said indirectly driven element and having one-way clutch means preventing the negative impulses from acting on the driven element and also having a yielding drive through which the positive impulses are transmitted.

13. A transmission comprising, in combination with an engine-driven driving shaft and a driven shaft axially alined therewith, a planetary transmission comprising a driven gear connected to said driven shaft, a sun gear driven directly by the driving shaft and acting on said driven gear, and a third gear also acting on the driven gear and which is driven by the driving shaft through an alternating impulse device having a one-way clutch which holds it during negative impulses.

14. A transmission comprising, in combination with an engine-driven driving shaft and a driven shaft axially alined therewith, a planetary transmission comprising a driven gear connected to said driven shaft, a first driving gear driven directly by the driving shaft and acting on said driven gear, and a second driving gear also acting on the driven gear and which is driven by the driving shaft through a torque-amplifying infinitely variable transmission device driving said second gear in the same direction as and at speeds approaching the speed of the driving shaft having means holding it against reverse rotation while the first driving gear drives the driven shaft positively at low speed.

15. A transmission comprising, in combination with an engine-driven driving shaft and a driven shaft axially alined therewith, a planetary transmission comprising a driven gear connected to said driven shaft, a first driving gear driven directly by the driving shaft and acting on said driven gear, and a second driving gear also acting on the driven gear and which is driven by the driving shaft through a torque-amplifying infinitely variable transmission device driving said second gear in the same direction as and at speeds approaching the speed of the driving shaft having means holding it against reverse rotation while the first driving gear drives the driven shaft positively at low speed, said transmission device including centrifugal means locking the driving shaft and the planetary transmission and the driven shaft all together for rotation in unison to give direct drive at high speed.

16. A transmission comprising, in combination with an engine-driven driving shaft and a driven shaft axially alined therewith, a planetary transmission comprising a driven gear connected to said driven shaft, a sun gear driven directly by the driving shaft and acting on said driven gear, and a third gear also acting on the driven gear and which is driven by the driving shaft through an alternating impulse device having a one-way clutch which holds it during negative impulses, there being a yielding driving connection between the alternating impulse device and the third gear.

17. A transmission comprising, in combination with a driving shaft and a driven shaft axially alined therewith, a planetary transmission connecting said shaft and including three elements one of which is a driven element connected to the driven shaft and the other two of which are driving elements connected to the driving shaft, said elements comprising respectively a sun gear and a ring gear coaxial therewith and a set of planetary gears meshing with both the sun gear and the ring gear and mounted on a gear carrier rotatable coaxially of the sun and ring gears, one of the two driving elements being directly driven by the driving shaft and the other being connected thereto by alternating-impulse means having a one-way clutch permitting transmission to said other driving element of the positive impulses only.

18. A transmission comprising, in combination with a driving shaft and a driven shaft axially alined therewith, a planetary transmission connecting said shaft and including three elements one of which is a driven element connected to the driven shaft and the other two of which are driving elements connected to the driving shaft, said elements comprising respectively a sun gear and a ring gear coaxial therewith and a set of planetary gears meshing with both the sun gear and the ring gear and mounted on a gear carrier rotatable coaxially of the sun and ring gears, one of the two driving elements being directly driven by the driving shaft and the other being connected thereto by alternating-impulse means having a one-way clutch permitting transmission to said other driving element of the positive impulses only, said driven shaft being selectively connectible to either of two of said elements, which thereby becomes the driven element, thereby permitting driving of the driven shaft in either direction.

19. Drive mechanism for an automobile or the like comprising, in combination with an engine flywheel and a standard selective change-speed transmission, means between and connecting the flywheel and the transmission and which comprises an alternating-impulse mass inertia device and a one-way clutch connected thereto for absorbing reversely acting impulses for transmitting to said transmission only the positive impulses of said device.

20. Drive mechanism for an automobile or the like comprising, in combination with an engine flywheel and a standard selective change-speed transmission, means between and connecting the flywheel and the transmission and which comprises an infinitely variable torque-multiplying transmission means responsive to torque and speed, said infinitely variable transmission means including a reaction member to provide a fulcrum for torque multiplication.

21. A transmission comprising a driving and a driven shaft connected by change-speed gearing having a plurality of elements providing two paths of power flow, one of which paths includes one of said elements connected to the driving shaft to provide a positive geared connection giving a positive low-gear for the transmission and the other of which paths comprises an infinitely-variable impulse type speed-varying device connected to another of said elements and cooperating with the geared connection to give a variable torque-amplifying intermediate speed, and cooperating clutch means on the gearing elements and the driven shaft whereby the driven shaft may be selectively connected to said elements, said transmission operating through both paths of power flow to give a direct one-to-one drive in high.

22. A transmission connecting a driving member to a driven member comprising a gear train including a plurality of elements, means for connecting one of said elements to the driven member, and means for separately connecting two other elements of the gear train to the driving member, one of said last named connections including an infinitely-variable torque-multiplying mechanism having driving and driven parts rotatable in the same direction and at speeds approaching one to one and means automatically variable in response to both speed and torque for driving the driven member from the driving member.

23. A transmission comprising a driving member and a driven member, an infinitely-variable torque multiplying transmission drivably connected to the driving member, a gear train including a plurality of elements one of which is connected to the driving member, a clutch member driven by said infinitely-variable transmission and adapted to selectively engage one or another of the elements of said gear train, and a clutch member connected to said driven member and adapted to selectively engage one or another of the elements of the gear train.

24. A transmission for connecting a driving member to a driven member comprising a planetary gear train, one element of which is connected to the driving member and another element of which is connected to the driven member and variable-speed torque-multiplying means separate from and connected to be driven at the same speed as one of the elements of the gear train and to drive another element of the gear train at variable speeds approaching the speed of said one element and in the same direction as said one element independently of said gearing whereby the driving ratio of said transmission will be varied, said gear set being so constructed and connected that reaction of the driven member tends to turn said other element in the direction opposite to that in which it is normally turned by the transmission.

25. A transmission connecting a driving member to a driven member comprising a gear train including a plurality of elements, means for connecting one of said elements to the driven member, and means for separately connecting two other elements of the gear train to the driving member, one of said last named connections including an infinitely-variable torque-multiplying mechanism having concentrically rotatable driving and driven parts rotatable in the same direction, and at speeds approaching the same speed as the transmission ratio approaches one to one.

26. A transmission connecting a driving shaft to a driven shaft comprising a gear train including a plurality of elements, means connecting one of said elements to the driven shaft, means connecting another of said elements to the driving shaft, and variable speed torque-multiplying means including a driving member coaxial with and connected to the driving shaft, a driven member coaxial with the driving shaft and connected to a third of said elements and means driving the driven member from and in the same direction as the driving member at speeds and torques automatically varying in accordance with the speed and the transmitted torque.

ADIEL Y. DODGE.